United States Patent
Nishimine et al.

(10) Patent No.: US 11,654,777 B2
(45) Date of Patent: May 23, 2023

(54) ELECTRIC VEHICLE

(71) Applicant: TOYOTA JIDOSHA KABUSHIKI KAISHA, Toyota (JP)

(72) Inventors: Akiko Nishimine, Susono (JP); Yoichiro Isami, Mishima (JP); Yoshio Itou, Susono (JP); Hiroyuki Amano, Susono (JP); Tatsuya Imamura, Okazaki (JP); Hiroaki Ebuchi, Hadano (JP); Hiroaki Kodera, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 197 days.

(21) Appl. No.: 17/352,960

(22) Filed: Jun. 21, 2021

(65) Prior Publication Data
US 2022/0041064 A1  Feb. 10, 2022

(30) Foreign Application Priority Data
Aug. 7, 2020  (JP) .............................. JP2020-135177

(51) Int. Cl.
*B60L 15/00*  (2006.01)
*B60L 15/20*  (2006.01)

(52) U.S. Cl.
CPC .......... *B60L 15/20* (2013.01); *B60L 2240/423* (2013.01); *B60L 2240/68* (2013.01); *B60L 2250/26* (2013.01)

(58) Field of Classification Search
CPC ...... B60L 15/20; B60L 15/28; B60L 15/2054; B60L 2240/423; B60L 2240/68; B60L 2240/14; B60L 2240/421; B60L 2240/461; B60L 2250/26; B60L 50/10; B60L 2260/26; B60L 2260/20; B60L 2260/44; Y02T 10/64; Y02T 10/70; Y02T 10/7072; Y02T 10/72; Y02T 90/16
See application file for complete search history.

(56) References Cited

U.S. PATENT DOCUMENTS

| | | | |
|---|---|---|---|
| 11,554,677 B2* | 1/2023 | Isami | B60K 26/02 |
| 2008/0060861 A1* | 3/2008 | Baur | B60K 1/00 180/65.6 |
| 2018/0281619 A1* | 10/2018 | Suzuki | B60L 15/20 |
| 2020/0101972 A1* | 4/2020 | Lee | F16H 59/105 |
| 2020/0384888 A1* | 12/2020 | Hasan | B60L 58/16 |

FOREIGN PATENT DOCUMENTS

| | | |
|---|---|---|
| JP | 2018-166386 A | 10/2018 |
| JP | 2018-191366 A | 11/2018 |

* cited by examiner

*Primary Examiner* — Sizo B Vilakazi
*Assistant Examiner* — Sherman D Manley
(74) *Attorney, Agent, or Firm* — Oliff PLC

(57) ABSTRACT

The electric vehicle according to the present disclosure is configured to be able to select a traveling mode between an MT mode in which an electric motor is controlled with torque characteristics like an MT vehicle having a manual transmission and an internal combustion engine, and an EV mode in which the electric motor is controlled with normal torque characteristics. When the selection of the travelling mode is changed by a driver, the controller of the electric vehicle determines whether a control mode can be switched, based on a condition in which the electric vehicle is placed, and switches the control mode in accordance with the determination result.

4 Claims, 13 Drawing Sheets

ELECTRIC VEHICLE

CROSS-REFERENCE TO RELATED APPLICATION

The present application claims priority under 35 U.S.C. § 119 to Japanese Patent Application No. 2020-135177, filed Aug. 7, 2020, the contents of which are incorporated herein by reference in their entirety.

BACKGROUND

Field

The present disclosure relates to an electric vehicle configured to use an electric motor as a power device for traveling.

Background Art

An electric motor used as a power device for traveling in an electric vehicle differs greatly in torque characteristic from an internal combustion engine used as a power device for traveling in a conventional vehicle. Due to the difference in torque characteristics of power devices, a transmission is essential for the conventional vehicle, whereas in general the electric vehicle is not equipped with a transmission. Of course, the electric vehicle is not equipped with a manual transmission (MT: Manual Transmission) that switches a gear ratio by manual operation by a driver. Therefore, there is a great difference in a driving feeling between driving of the conventional vehicle with the MT (hereinafter referred to as MT vehicle) and driving of the electric vehicle.

On the other hand, the torque of the electric motor can be controlled relatively easily by controlling the applied voltage and magnetic field. Therefore, the electric motor can obtain a desired torque characteristic within an operating range of the electric motor by implementing appropriate motor control. Taking advantage of this feature, a technique to simulate the torque characteristic peculiar to the MT vehicle by controlling the torque of the electric vehicle has been proposed so far.

JP 2018-166386 discloses a technique for producing a pseudo shift change in a vehicle that transmits torque to wheels from a drive motor. In this vehicle, at a predetermined opportunity defined by a vehicle speed, an accelerator opening, an accelerator opening speed, or a brake depression amount, after reducing the torque of the drive motor by a set variation amount, torque variation control is performed to increase the torque again at a predetermined time period. Thus, an uncomfortable feeling given to a driver familiar with a vehicle equipped with a stepped transmission is suppressed.

However, in the above technique, it is impossible to determine the timing of executing the torque variation control simulating the speed change operation voluntarily by the driver's own operation. In particular, for the driver accustomed to driving the MT vehicle, pseudo speed change operation without intervention of manual speed change operation by the driver has a possibility that a discomfort is given to the driving feeling of the driver seeking pleasure to operate the MT.

SUMMARY

In view of such circumstances, the inventors of the present application are considering providing a pseudo-gearshift and a pseudo-clutch pedal on the electric vehicle so as to obtain a feeling of driving the MT vehicle in the electric vehicle. Of course, these pseudo-devices are not simply attached to the electric vehicle. The inventors of the present application are considering allowing the electric motor to be controlled by operating the pseudo-gearshift and pseudo-clutch pedal so that the torque characteristic similar to that of the MT vehicle can be obtained.

However, the constant need for manipulation of the pseudo-gearshift and pseudo-clutch pedal compromises the ease of driving and acceleration performance superior to the conventional vehicle, which are one of the features of the electric vehicle. The driver wants to drive like the MT vehicle, or wants to drive as the normal electric vehicle, for example, depending on traveling conditions and own mood. As a method for realizing such a request, it is considered that a control mode simulating the MT vehicle and a normal control mode as the electric vehicle are prepared as control modes of the electric motor and are switched arbitrarily.

Here, there is one thing to note. The control performed in the control mode of the electric motor simulating the MT vehicle differs in logic from the control performed in the normal control mode of the electric motor as the electric vehicle. Therefore, there is a possibility that a discontinuity in control occurs at the time of switching the control mode, causing a deviation between intention of the driver and the actual control result. Depending on the situation in which the vehicle is placed, such a deviation may lead to anxiety for the driver and also affect the safety of traveling.

The present disclosure has been made in view of the above problems, and an object thereof is to provide an electric vehicle capable of enjoying both driving like an MT vehicle and driving as a normal electric vehicle without unsafety and anxiety.

The electric vehicle according to the present disclosure is an electric vehicle using an electric motor as a power device for traveling, comprising an accelerator pedal, a pseudo-clutch pedal, a pseudo-gearshift, an external sensor, a mode selector, and a controller. The external sensor is a sensor configured to detect a condition in which the electric vehicle is placed. The mode selector is a device configured to select a control mode of the electric motor between a first mode and a second mode. The controller is a device configured to control a motor torque output by the electric motor in accordance with the control mode selected by the mode selector.

The controller comprises a memory and a processor. The memory stores an MT vehicle model and a motor torque command map. The MT vehicle model is a model simulating a torque characteristic of a driving wheel torque in an MT vehicle The MT vehicle referred to herein is a vehicle having an internal combustion engine whose torque is controlled by operation of a gas pedal and a manual transmission whose gear stage is switched by operation of a clutch pedal and operation of a gearshift. The MT vehicle model is used in the first mode. The motor torque command map is a map defining a relationship of a motor torque with respect to an operation amount of the accelerator pedal and a rotation speed of the electric motor. The motor torque command map is used in the second mode.

When controlling the electric motor in the first mode, the processor executes the following first to fifth processes. The first process is a process of receiving an operation amount of the accelerator pedal as an input of an operation amount of the gas pedal with respect to the MT vehicle model. The second process is a process of receiving an operation amount of the pseudo-clutch pedal as an input of an operation amount of the clutch pedal with respect to the MT vehicle model. The third process is a process of receiving a shift position of the pseudo-gearshift as an input of a shift position of the gearshift with respect to the MT vehicle model. The fourth process is a process of calculating the driving wheel torque determined from the operation amount of the gas pedal, the operation amount of the clutch pedal and the shift position of the gearshift using the MT vehicle model. Then, the fifth process is a process of calculating the motor torque for giving the driving wheel torque to driving wheels of the electric vehicle.

When controlling the electric motor in the second mode, the processor executes the following sixth and seventh processing. The sixth process is a process of disabling the operation of the pseudo-clutch pedal and the operation of the pseudo-gearshift. The seventh process is a process of calculating the motor torque using the motor torque command map based on the operation amount of the accelerator pedal and the rotation speed of the electric motor.

When the selection of the control mode is changed by the mode selector, the processor executes the following eighth and ninth processes. The eighth process is a process of performing a first determination whether the control mode can be switched, based on the condition detected by the external sensor. The ninth process is a process of switching the control mode according to the result of the first determination.

According to the above configuration, the driver can drive the electric vehicle like an MT vehicle having an internal combustion engine and a manual transmission by selecting the first mode by the mode selector. That is, the driver can enjoy clutch pedal operation and gearshift operation like an MT vehicle. The driver can also drive the electric vehicle with its original performance by selecting the second mode by the mode selector. In other words, the driver can enjoy the ease of driving and acceleration performance, which are one of the features of the electric vehicle.

Furthermore, according to the above configuration, when the selection of the control mode is changed by the mode selector, rather than immediately the control mode is switched, the condition in which the self vehicle is placed is considered. That is, it is determined whether the switching of the control mode is possible based on the condition in which the self vehicle is placed, and switching of the control mode is executed according to the determination result. This allows the driver to enjoy both driving like an MT vehicle and driving as a normal electric vehicle without anxiety and safely.

In the electric vehicle according to the present disclosure, the processor, when the result of the first determination is negative, may execute any one of the following tenth and eleventh processes. The tenth process is a process of rejecting switching of the control mode. The eleventh process is a process of suspending the change of selection of the control mode by the mode selector until the result of the first determination becomes affirmative.

In the electric vehicle according to the present disclosure, the external sensor may be configured to detect at least one of a distance to a preceding vehicle, a distance to a succeeding vehicle, a degree of congestion of a road, and presence or absence of a pedestrian as the condition in which the self vehicle is placed.

In the electric vehicle according to the present disclosure, the processor may execute the following twelfth and thirteenth processes when the electric motor is controlled in the first mode. The twelfth process is a process of performing a second determination whether it is possible to continue the first mode, based on the condition detected by the external sensor. The thirteenth process is a process of forcibly switching the control mode from the first mode to the second mode, when the result of the second determination is negative.

As described above, according to the present disclosure, it is possible to provide an electric vehicle capable of enjoying both driving like an MT vehicle and driving as a normal electric vehicle without unsafety and anxiety.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. Configuration of Electric Vehicle

Figure 1:
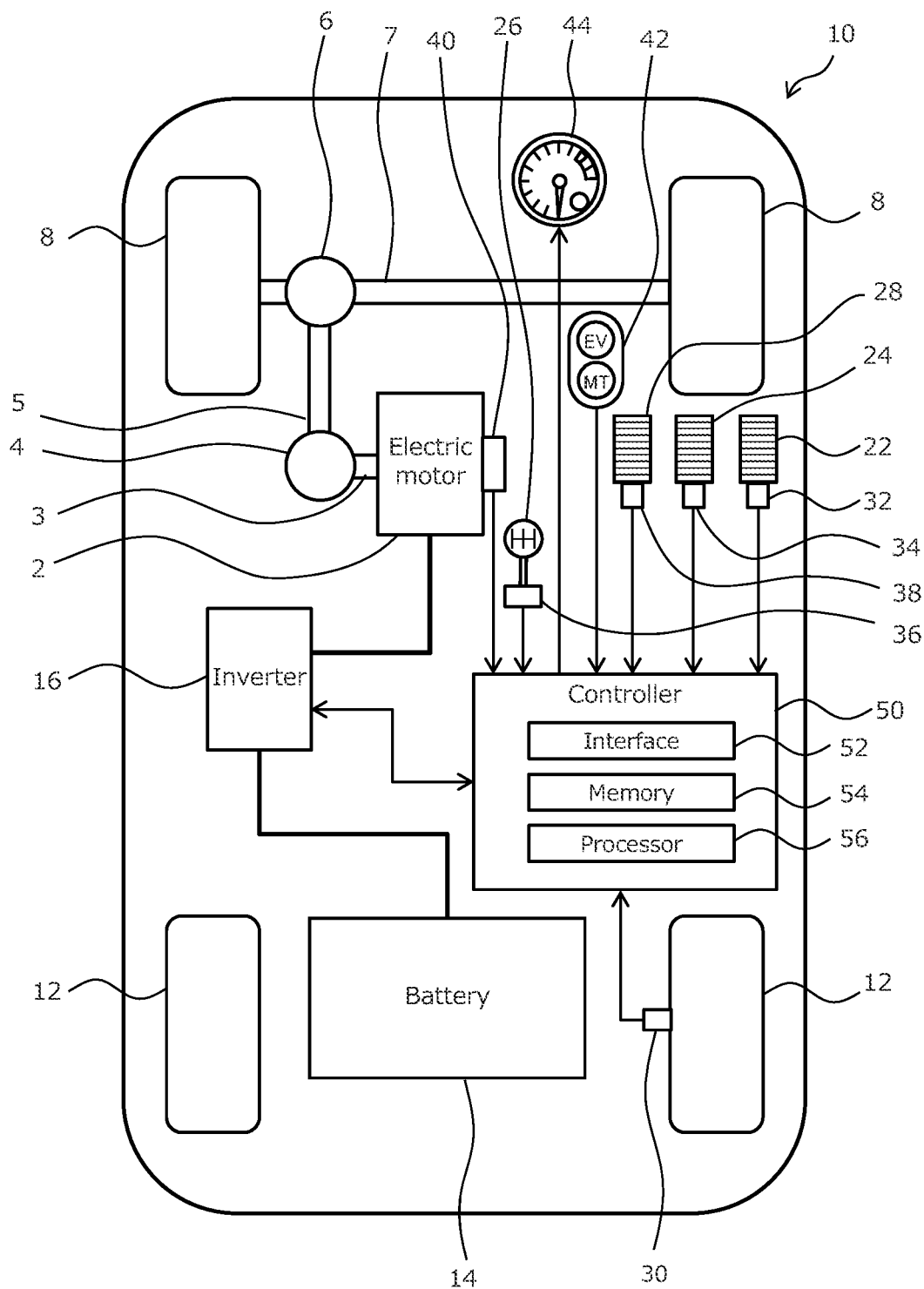
FIG. 1 is a diagram schematically illustrating a configuration of a power system of an electric vehicle according to an embodiment of the present disclosure.

FIG. 1 is a diagram schematically illustrating a configuration of a power system of an electric vehicle 10 according to the present embodiment. As shown in FIG. 1, the electric vehicle 10 is provided with an electric motor 2 as a power source. The electric motor 2 is, for example, a brushless DC motor or a three-phase AC synchronous motor. The electric motor 2 is provided with a rotation speed sensor 40 for detecting its rotation speed. An output shaft 3 of the electric motor 2 is connected to one end of a propeller shaft 5 via a gear mechanism 4. The other end of the propeller shaft 5 is connected to a drive shaft 7 at the front of the vehicle via a differential gear 6.

The electric vehicle 10 includes driving wheels 8, which are front wheels, and driven wheels 12, which are rear wheels. The driving wheels 8 are provided on both ends of the drive shaft 7, respectively. Each wheel 8 and 12 is provided with a wheel speed sensor 30. In FIG. 1, only the wheel speed sensor 30 of the right-hand rear wheel is represented. The wheel speed sensor 30 is also used as a vehicle speed sensor for detecting the vehicle speed of the electric vehicle 10. The wheel speed sensor 30 is connected to a controller 50 to be described later by an in-vehicle network such as CAN (Controller Area Network).

The electric vehicle 10 includes a battery 14 and a inverter 16. The battery 14 stores electrical energy that drives the electric motor 2. The inverter 16 converts DC power input from the battery 14 to driving power for the electric motor 2. Power conversion by the inverter 16 is performed by PWM (Pulse Wave Modulation) control by the controller 50. The inverter 16 is connected to the controller 50 by the in-vehicle network.

The electric vehicle 10 includes an accelerator pedal 22 for inputting an acceleration request and a brake pedal 24 for inputting a braking request as operation request input devices for inputting operation requests from the driver to the electric vehicle 10. The accelerator pedal 22 is provided with an accelerator position sensor 32 for detecting an accelerator opening Pap[%] which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 by the in-vehicle network.

The electric vehicle 10 further includes a pseudo-gearshift 26 and a pseudo-clutch pedal 28 as operation inputting devices. A gearshift and a clutch pedal are devices that operate a manual transmission (MT), but of course the electric vehicle 10 is not equipped with the MT. The pseudo-gearshift 26 and the pseudo-clutch pedal 28 are dummies that differ from the original gearshift and clutch pedal.

The pseudo-gearshift 26 has a structure that simulates a gearshift installed in an MT vehicle. The arrangement and operating feeling of the pseudo-gearshift 26 are equivalent to those of the real MT vehicle. The pseudo-gearshift 26 has positions that correspond to each gear stage, for example, first-speed stage, second-speed stage, third-speed stage, fourth-speed stage, fifth-speed stage, sixth-speed stage, reverse stage, and neutral stage. The pseudo-gearshift 26 is equipped with a shift position sensor 36 for detecting gear stage by determining which position the pseudo-gearshift 26 is in. The shift position sensor 36 is connected to the controller 50 by the in-vehicle network.

The pseudo-clutch pedal 28 has a structure that simulates a clutch pedal installed in the MT vehicle. The arrangement and operating feeling of the pseudo-clutch pedal 28 are equivalent to those of the real MT vehicle. When the driver wants to change the setting of the gear stage by the pseudo-gearshift 26, the driver depresses the pseudo-clutch pedal 28, and after finishing the setting change of the gear stage, ceases depressing to release the pseudo-clutch pedal 28. The pseudo-clutch pedal 28 is equipped with a clutch position sensor 38 for detecting depression amount Pc[%] of the pseudo-clutch pedal 28. The clutch position sensor 38 is connected to the controller 50 by the in-vehicle network.

The electric vehicle 10 is equipped with a pseudo-engine speed meter 44. An engine speed meter is a device that displays a rotation speed of an internal combustion engine to the driver, but of course, the electric vehicle 10 is not equipped with the internal combustion engine. The pseudo-engine speed meter 44 is, of course, a dummy that differs from the original engine speed meter. The pseudo-engine speed meter 44 has a structure that simulates the engine speed meter installed in the conventional vehicle. The pseudo-engine speed meter 44 may be a mechanical type or a liquid crystal display type. In the case of the liquid crystal display type, a revolution limit may be arbitrarily set in the pseudo-engine speed meter 44. The pseudo-engine speed meter 44 is connected to the controller 50 by the in-vehicle network.

The electric vehicle 10 is equipped with a mode selector 42. The mode selector 42 is a selector for selecting a traveling mode of the electric vehicle 10. The traveling mode of the electric vehicle 10 includes an MT mode and an EV mode. The mode selector 42 is configured to be capable of selecting either MT mode or EV mode arbitrary. Details will be described later, in the MT mode, the electric motor 2 is controlled in the control mode for driving the electric vehicle 10 like the MT vehicle (first mode). In the EV mode, the electric motor 2 is controlled in the normal control mode for the common electric vehicle (second mode). The mode selector 42 is connected to the controller 50 by the in-vehicle network.

Figure 2:
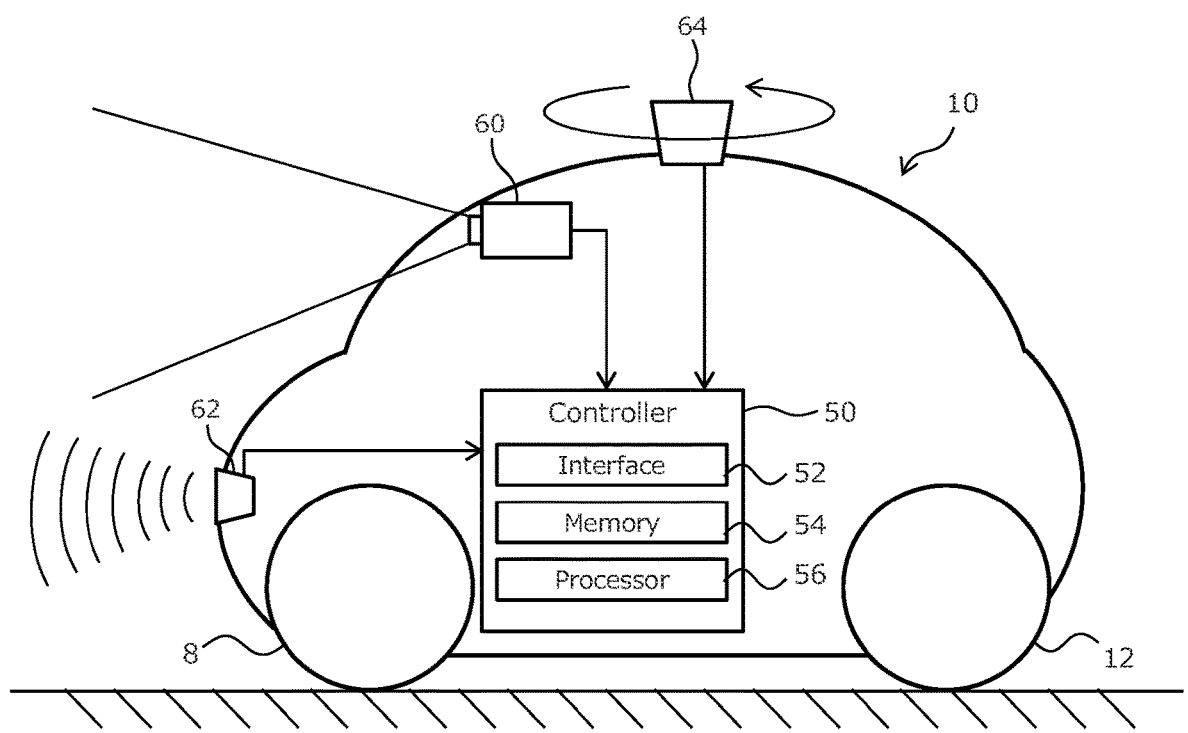
FIG. 2 is a diagram schematically illustrating a configuration of an information collection system of the electric vehicle according to the embodiment of the present disclosure.

FIG. 2 is a diagram schematically illustrating a configuration of an information collection system of the electric vehicle 10 according to the present embodiment. As shown in FIG. 2, the electric vehicle 10 includes a camera 60, a radar 62, and a LIDAR 64 as external sensors for detecting conditions in which the self vehicle is placed. The camera 60 is mounted so as to image at least the front of the self vehicle. The camera 60 is, for example, a stereo camera equipped with a CMOS image sensor. The radar 62 is specifically a millimeter wave radar and is attached to the front portion of the vehicle. The LIDAR 64 is mounted, for example, on the roof of the vehicle. These external sensors 60, 62, 64 are connected to the controller 50 by the in-vehicle network.

The controller 50 is typically an ECU (Electronic Control Unit) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM (Random Access Memory) for temporarily recording data and a ROM (Read Only Memory) for storing a control program executable by the processor 56 and various data related to the control program. The processor 56 executes the control program read with the related data from the memory 54, and generates a control signal based on the signal obtained from each sensor.

Figure 3:
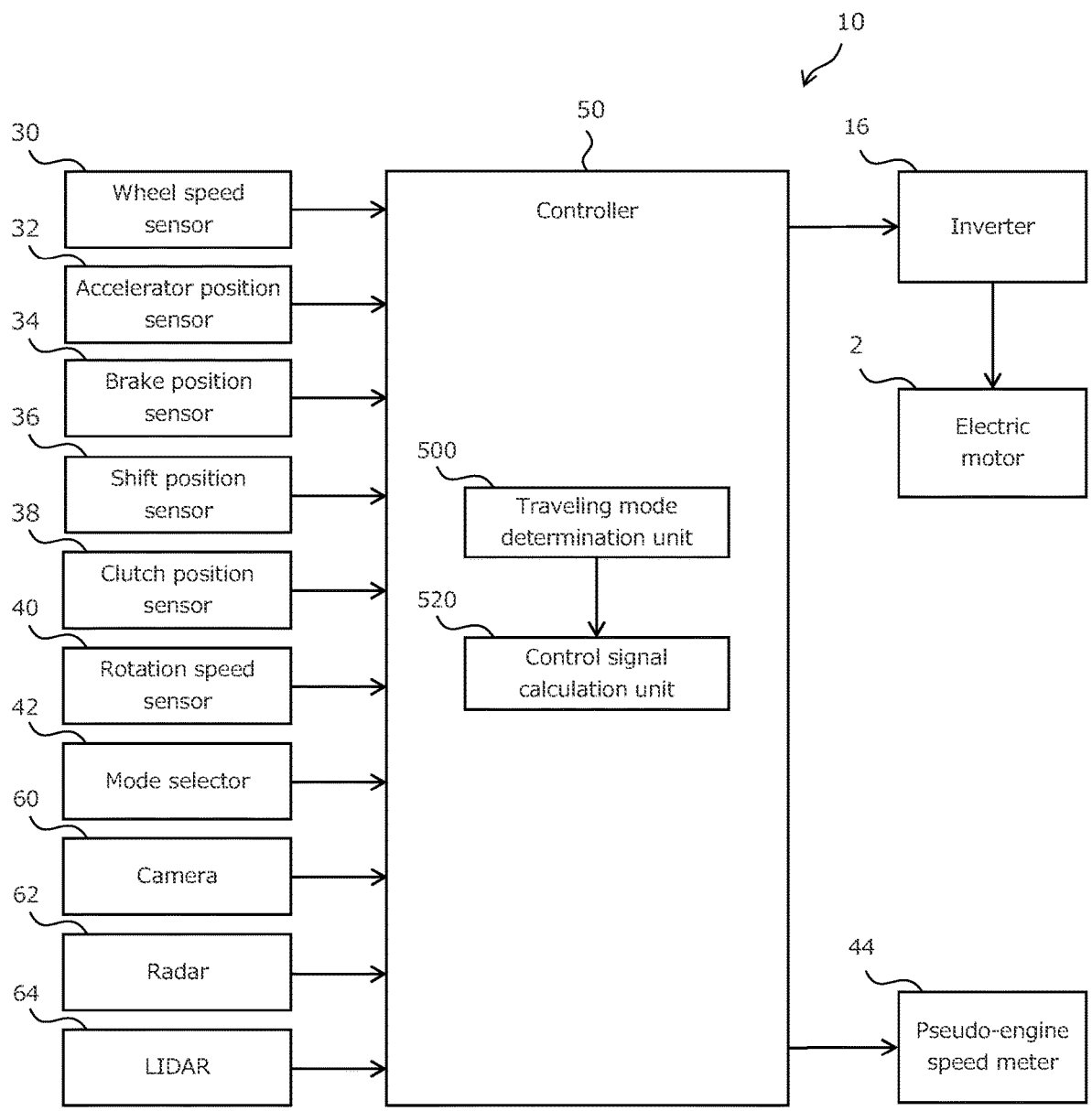
FIG. 3 is a block diagram illustrating a configuration of a control system of the electric vehicle shown in FIGS. 1 and 2.

FIG. 3 is a block diagram illustrating a configuration of a control system of the electric vehicle 10 according to the present embodiment. The controller 50 receives signals at least from the wheel speed sensor 30, the accelerator position sensor 32, the brake position sensor 34, the shift position sensor 36, the clutch position sensor 38, the rotation speed sensor 40, the mode selector 42, the camera 60, the radar 62, and the LIDAR 64. The in-vehicle network is used for communication between these sensors and the controller 50. Although not shown, in addition to these sensors, various other sensors are mounted on the electric vehicle 10, and connected to the controller 50 by the in-vehicle network.

Further, from the controller 50, a signal is output to at least the inverter 16 and the pseudo-engine speed meter 44. The in-vehicle network is used for communication between these devices and the controller 50. Although not shown, in addition to these devices, various other actuators and indicators are mounted on the electric vehicle 10, and connected to the controller 50 by the in-vehicle network.

The controller 50 has a function as a traveling mode determination unit 500 and a function as a control signal calculation unit 520. More specifically, the processor 56 functions at least as the traveling mode determination unit 500 and as the control signal calculation unit 520 when a program stored in the memory 54 is executed by the processor 56. The traveling mode determination is a function to determine whether the electric vehicle 10 is to travel in the EV mode or the MT mode. The control signal calculation is a function to calculate a control signal for an actuator or a device. The control signal includes at least a signal for PWM control of the inverter 16, and a signal for displaying information on the pseudo-engine speed meter 44. These functions of the controller 50 will be described below.

2. Functions of Controller 2-1. Motor Torque Calculation Function

Figure 4:
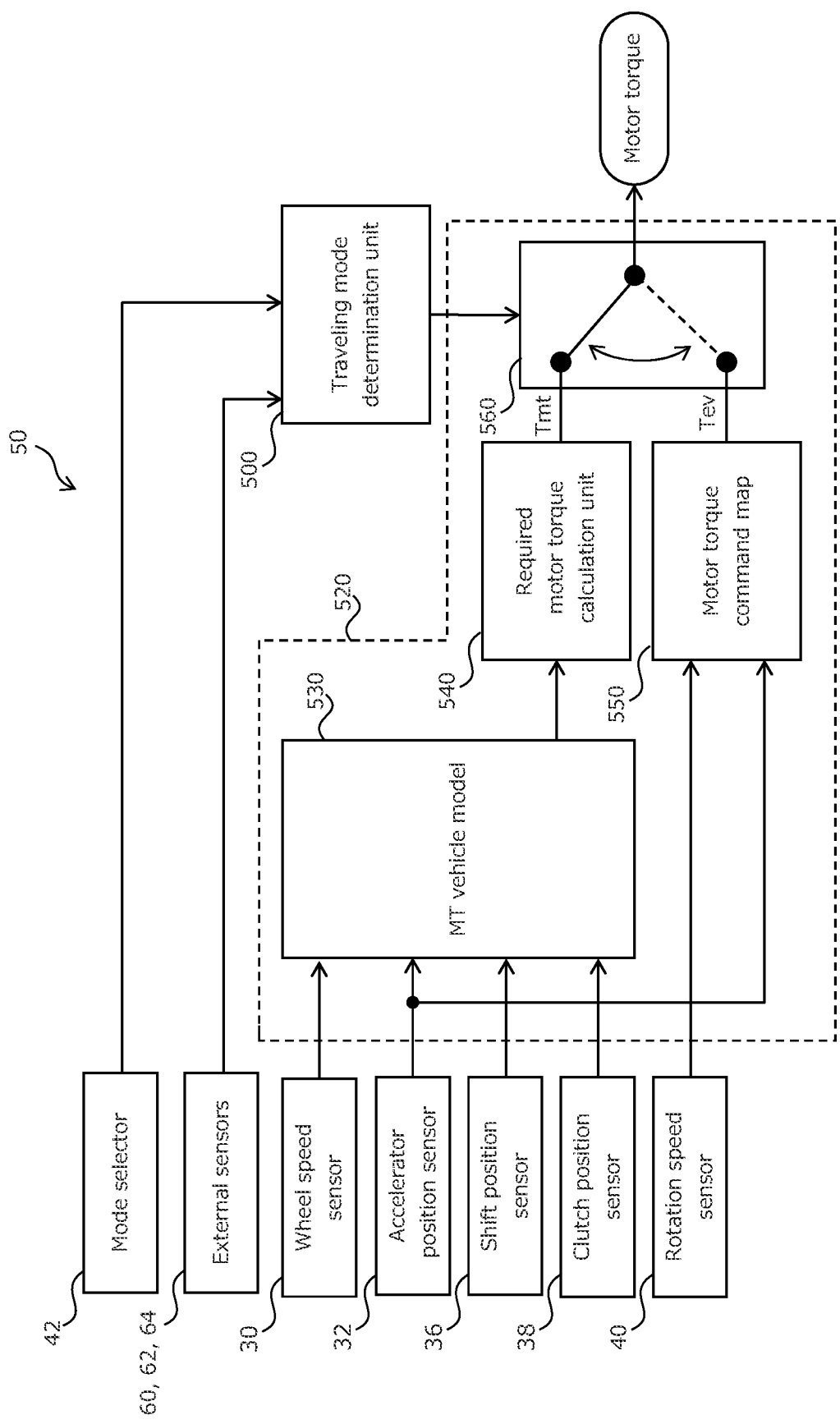
FIG. 4 is a block diagram illustrating functions of the controller of the electric vehicle shown in FIGS. 1 and 2.

FIG. 4 is a block diagram illustrating functions of the controller 50 according to the present embodiment, in particular, a function relating to a calculation of the motor torque command value for the electric motor 2. The controller 50 calculates the motor torque command value by the function shown in this block diagram, and generates the control signal for the PWM control of the inverter 16 based on the motor torque command value.

As shown in FIG. 4, the control signal calculation unit 520 comprises an MT vehicle model 530, a required motor torque calculation unit 540, a motor torque command map 550, and a changeover switch 560. The control signal calculation unit 520 receives signals from the wheel speed sensor 30, the accelerator position sensor 32, the shift position sensor 36, the clutch position sensor 38, and the rotation speed sensor 40. The control signal calculation unit 520 processes the signals from these sensors and calculates motor torque which the electric motor 2 is made to output.

There are two types of calculation of motor torque by the control signal calculation unit 520: calculation using the MT vehicle model 530 and the required motor torque calculation unit 540, and calculation using the motor torque command map 550. The former is used to calculate motor torque when the electric vehicle 10 is to travel in the MT mode. The latter is used to calculate motor torque when the electric vehicle 10 is to travel in the EV mode. Which motor torque is used depends on the changeover switch 560. Switching by the changeover switch 560 is performed based on the determination by the traveling mode determination unit 500.

2-2. Calculation of Motor Torque in MT Mode

The driving wheel torque of the MT vehicle is determined from the operation of a gas pedal that controls fuel supply to the engine, the operation of a gearshift that switches a gear stage of the MT, and the operation of a clutch pedal that operates a clutch between the engine and the MT. The MT vehicle model 530 is a model that calculates the driving wheel torque obtained by operating the accelerator pedal 22, the pseudo-clutch pedal 28, and the pseudo-gearshift 26 assuming that the electric vehicle 10 is equipped with the engine, the clutch, and the MT. Hereinafter, the engine, the clutch, and the MT, which are imaginarily realized by the MT vehicle model 530 in the MT mode, will be referred to as an imaginary engine, an imaginary clutch, and an imaginary MT.

The MT vehicle model 530 receives a signal of the accelerator position sensor 32 as an operation amount of the gas pedal of the imaginary engine. A signal of the shift position sensor 36 is input to the MT vehicle model 530 as a shift position of the gearshift of the imaginary MT. Further, a signal of the clutch position sensor 38 is input to the MT vehicle model 530 as an operation amount of the clutch pedal of the imaginary clutch. The MT vehicle model 530 also receives a signal of the wheel speed sensor 30 as a signal indicating the load condition of the vehicle. The MT vehicle model 530 is a model simulating the torque characteristic of the driving wheel torque in the MT vehicle. The MT vehicle model 530 is configured so that the operation of the accelerator pedal 22, the pseudo-gearshift 26, and the pseudo-clutch pedal 28 by the driver is reflected in the value of the driving wheel torque. The detail of the MT vehicle model 530 will be described later.

The required motor torque calculation unit 540 converts the driving wheel torque calculated by the MT vehicle model 530 into a required motor torque. The required motor torque is the motor torque required for realizing the driving wheel torque calculated by the MT vehicle model 530. The reduction ratio from the output shaft 3 of the electric motor 2 to the driving wheels 8 is used to convert the driving wheel torque into the required motor torque.

2-3. Calculation of Motor Torque in EV Mode

Figure 5:
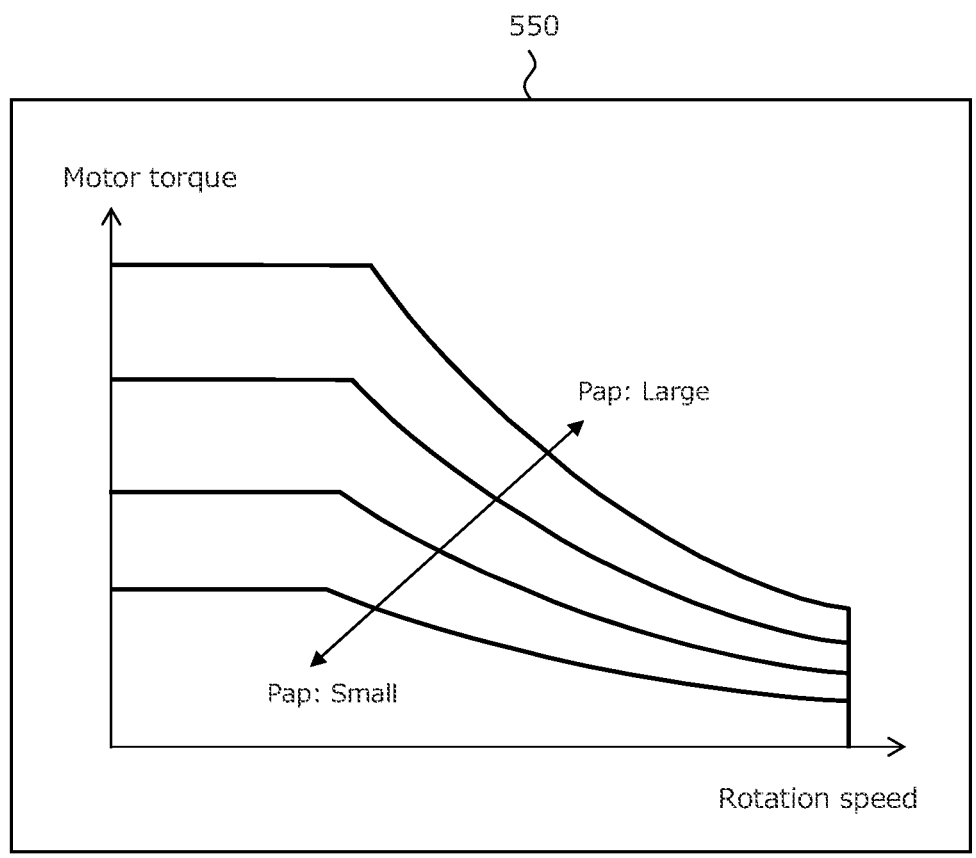
FIG. 5 is a diagram illustrating an example of a motor torque command map provided by the controller shown in FIG. 4.

FIG. 5 is a diagram illustrating an example of the motor torque command map 550 used for calculating the motor torque in the EV mode. The motor torque command map 550 is a map to determine the motor torque using the accelerator opening Pap and the rotation speed of the electric motor 2 as parameters. A signal of the accelerator position sensor 32 and a signal of the rotation speed sensor 40 are input to the respective parameters of the motor torque command map 550. The motor torque corresponding to these signals is output from the motor torque command map 550.

2-4. Switching of Motor Torque

The motor torque calculated using the motor torque command map 550 is denoted as Tev, and the motor torque calculated using the MT vehicle model 530 and the required motor torque calculation unit 540 is denoted as Tmt. The motor torque selected by the changeover switch 560 among the two motor torques Tev and Tmt is given as the motor torque command value for the electric motor 2.

In the EV mode, even if the driver operates the pseudo-gearshift 26 or the pseudo-clutch pedal 28, the driver's operation is not reflected in driving of the electric vehicle 10. In other words, the operation of the pseudo-gearshift 26 and the operation of the pseudo-clutch pedal 28 are disabled in the EV mode. However, even while the motor torque Tev is output as the motor torque command value, the calculation of the motor torque Tmt using the MT vehicle model 530 is continued. Conversely, the calculation of the motor torque Tev is continued even while the motor torque Tmt is output as the motor torque command value. That is, both the motor torque Tev and the motor torque Tmt are continuously input to the changeover switch 560.

By switching the input by the changeover switch 560, the motor torque command value is switched from the motor torque Tev to the motor torque Tmt, or from the motor torque Tmt to the motor torque Tev. At this time, when there is a deviation between the two motor torques, a torque level difference is generated with switching. Therefore, for a while after switching, so as not to cause a sudden change in torque, the gradual change process is performed on the motor torque command value. For example, in the switching from the EV mode to the MT mode, the motor torque command value is not immediately switched from the motor torque Tev to the motor torque Tmt, it is gradually changed toward the motor torque Tmt at a predetermined rate of change. The same process is performed in switching from the MT mode to the EV mode.

The changeover switch 560 is operated by a signal from the traveling mode determination unit 500 described below. The traveling mode determination unit 500 receives signals from the external sensors 60, 62, 64 in addition to a signal from the mode selector 42. Information about the conditions in which the self vehicle is placed is obtained from the signals from the external sensors 60, 62, 64. The traveling mode determination unit 500 operates the changeover switch 560, considering not only the selection by the mode selector 42 but also the conditions in which the self vehicle is placed. The detail of the traveling mode determination by the traveling mode determination unit 500 will be described later.

2-5. MT Vehicle Model

2-5-1. Summary

Figure 6:
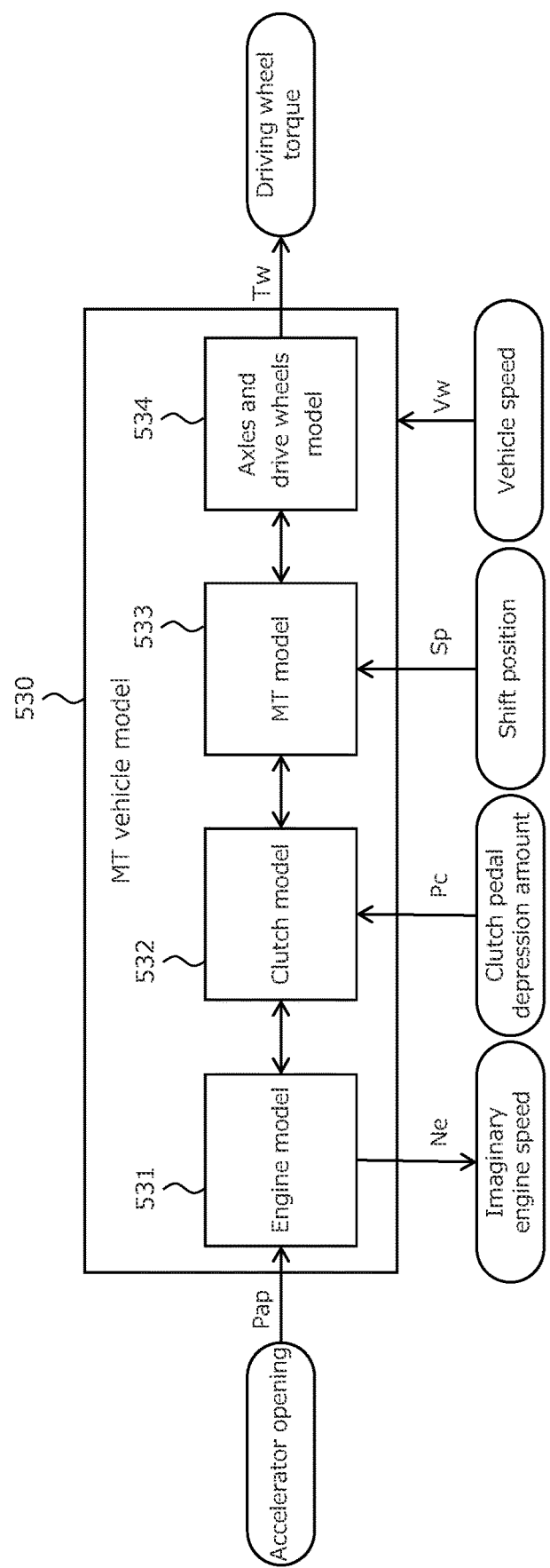
FIG. 6 is a block diagram illustrating an example of an MT vehicle model provided by the controller shown in FIG. 4.

Next, the MT vehicle model 530 will be described. FIG. 6 is a block diagram illustrating an example of the MT vehicle model 530. The MT vehicle model 530 comprises an engine model 531, a clutch model 532, an MT model 533, and an axles and drive wheels model 534. The engine model 531 is a model of the imaginary engine. The clutch model 532 is a model of the imaginary clutch. The MT model 533 is a model of the imaginary MT. The axles and drive wheels model 534 is a model of the imaginary torque transmission system from the axles to the driving wheels. Each model may be represented by a calculation formula or may be represented by a map.

Calculation results are input and output between models. Further, the accelerator opening Pap detected by the accelerator position sensor 32 is input to the engine model 531. The clutch pedal depression amount Pc detected by the clutch position sensor 38 is input to the clutch model 532. The shift position Sp detected by the shift position sensor 36 is input to the MT model 533. Furthermore, in the MT vehicle model 530, the vehicle speed Vw (or wheel speed) detected by the wheel speed sensor 30 is used in a plurality of models. In the MT vehicle model 530, a driving wheel torque Tw and an imaginary engine speed Ne are calculated based on these input signals.

2-5-2. Engine Model

The engine model 531 calculates the imaginary engine speed Ne and an imaginary engine output torque Teout. The engine model 531 comprises a model to calculate the imaginary engine speed Ne and a model to calculate the imaginary engine output torque Teout. For calculating the imaginary engine speed Ne, for example, a model expressed by the following equation (1) is used. In the following equation (1), the imaginary engine speed Ne is calculated from a rotation speed Nw of the wheel 8, a total reduction ratio R, and a slip ratio Rslip of the imaginary clutch mechanism.

$$Ne = Nw \times \frac{1}{R} \times Rslip \tag{1}$$

In the equation (1), the rotation speed Nw of the wheel 8 is detected by the wheel speed sensor 30. The total reduction ratio R is calculated from a gear ratio r calculated by the MT model 533 to be described later and the reduction ratio specified by the axles and drive wheels model 534. The slip ratio Rslip is calculated by the clutch model 532 to be described later. The imaginary engine speed Ne is displayed on the pseudo-engine speed meter 44 when the MT mode is selected.

Incidentally, during idling of the MT vehicle, idle speed control (ISC control) is executed to maintain the engine speed at a constant rotation speed. Therefore, the engine model 531 calculates the imaginary engine speed Ne as a predetermined idling speed (for example, 1000 rpm), when the imaginary clutch mechanism is disengaged, the vehicle speed is 0 and the accelerator opening Pap is 0%.

Figure 7:
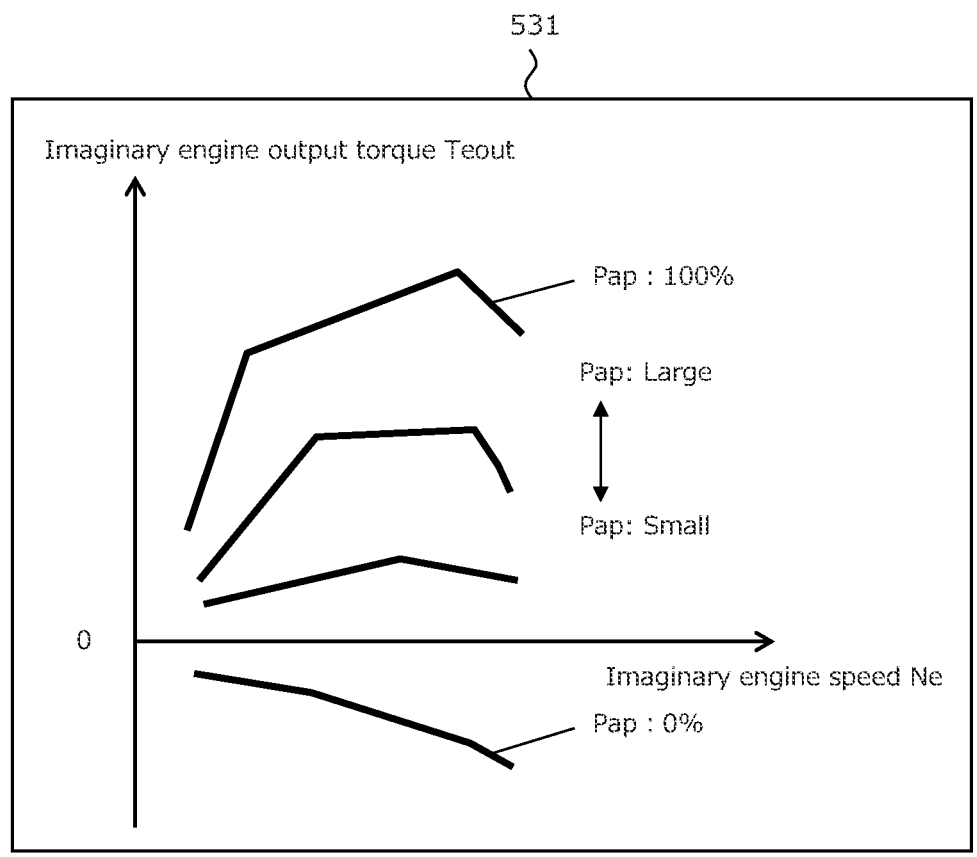
FIG. 7 is a diagram illustrating an example of an engine model constituting the MT vehicle model shown in FIG. 6.

The engine model 531 calculates the imaginary engine output torque Teout from the imaginary engine speed Ne and the accelerator opening Pap. For calculating the imaginary engine output torque Teout, for example, a two-dimensional map as shown in FIG. 7 is used. In this two-dimensional map, imaginary engine outputting torque Teout for imaginary engine speed Ne is given for each accelerator opening Pap. The torque characteristic shown in FIG. 7 can be set to the characteristic assumed for a gasoline engine or can be set to that assumed for a diesel engine. In addition, the torque characteristic can be set to that assumed for an natural intake engine or can be set to that assumed for a turbocharged engine. A selector for selecting the imaginary engine of the MT mode may be provided so that the driver can chose a preferred setting. The imaginary engine output torque Teout calculated by the engine model 531 is output to the clutch model 532.

2-5-3. Clutch Model

Figure 8:
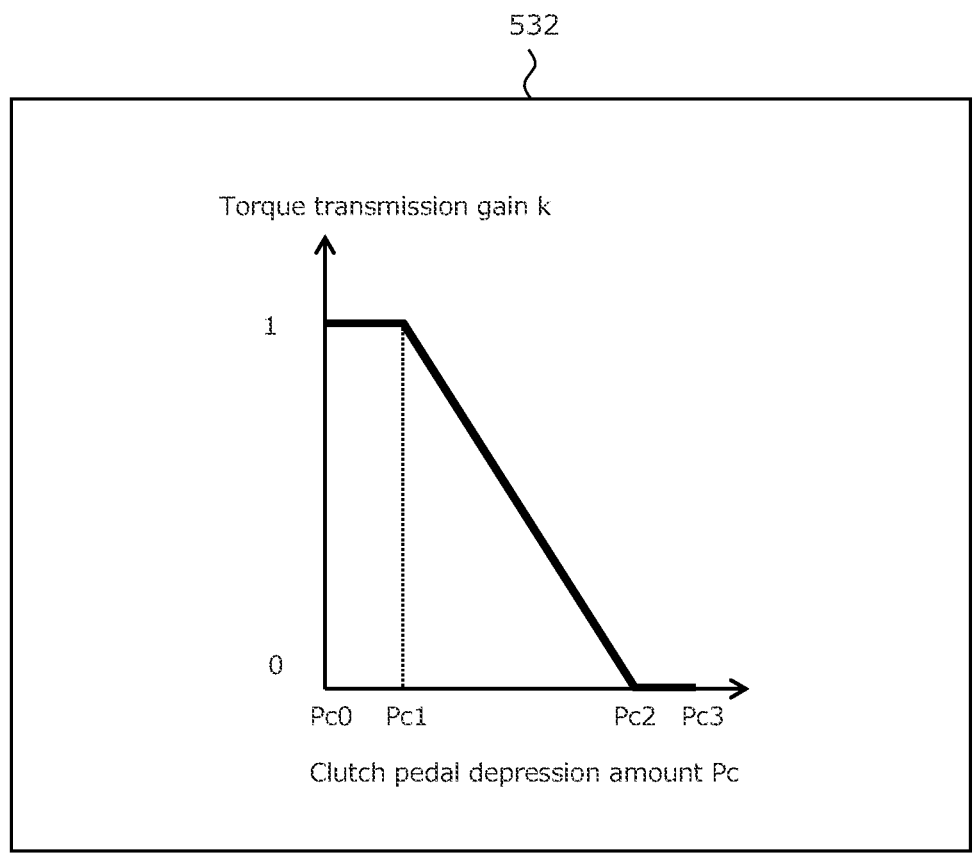
FIG. 8 is a diagram illustrating an example of a clutch model constituting the MT vehicle model shown in FIG. 6.

The clutch model 532 calculates a torque transmission gain k. The torque transmission gain k is a gain for calculating the torque transmission degree of the imaginary clutch corresponding to the depression amount of the pseudo-clutch pedal 28. The clutch model 532 has, for example, a map as shown in FIG. 8. In this map, the torque transmission gain k is given for the clutch pedal depression amount Pc. In FIG. 8, the torque transmission gain k is 1 when the clutch pedal depression amount Pc is in the range from Pc0 to Pc1, the torque transmission gain k monotonically decreases at a constant slope when the clutch pedal depression amount Pc is in the range from Pc1 to Pc2, and the torque transmission gain k is 0 when the clutch pedal depression amount Pc is in the range from Pc2 to Pc3. Here, Pc0 corresponds to the position where the clutch pedal depression amount Pc is 0%, Pc1 corresponds to the position of the play limit when the clutch pedal is depressed, Pc3 corresponds to the position where the clutch pedal depression amount Pc is 100%, and Pc2 corresponds to the play limit when the clutch pedal is returned from Pc3.

The map shown in FIG. 8 is an example. The change in the torque transmission gain k with respect to an increase in the clutch pedal depression amount Pc is not limited to the change curve shown in FIG. 8 as long as it is a broad monotonic decrease toward 0. For example, the change in the torque transmission gain k in the range from Pc1 to Pc2 may be a monotonically decreasing curve that is convex upward or a monotonically decreasing curve that is convex downward.

The clutch model 532 calculates a clutch output torque Tcout using the torque transmission gain k. The clutch output torque Tcout is the torque output from the imaginary clutch. The clutch model 532 calculates the clutch output torque Tcout from the imaginary engine output torque Teout and the torque transmission gain k by, for example, the following equation (2). The clutch output torque Tcout calculated by the clutch model 532 is output to the MT model 533.

$$Tcout = Teout \times k \tag{2}$$

2-5-4. MT Model

Figure 9:
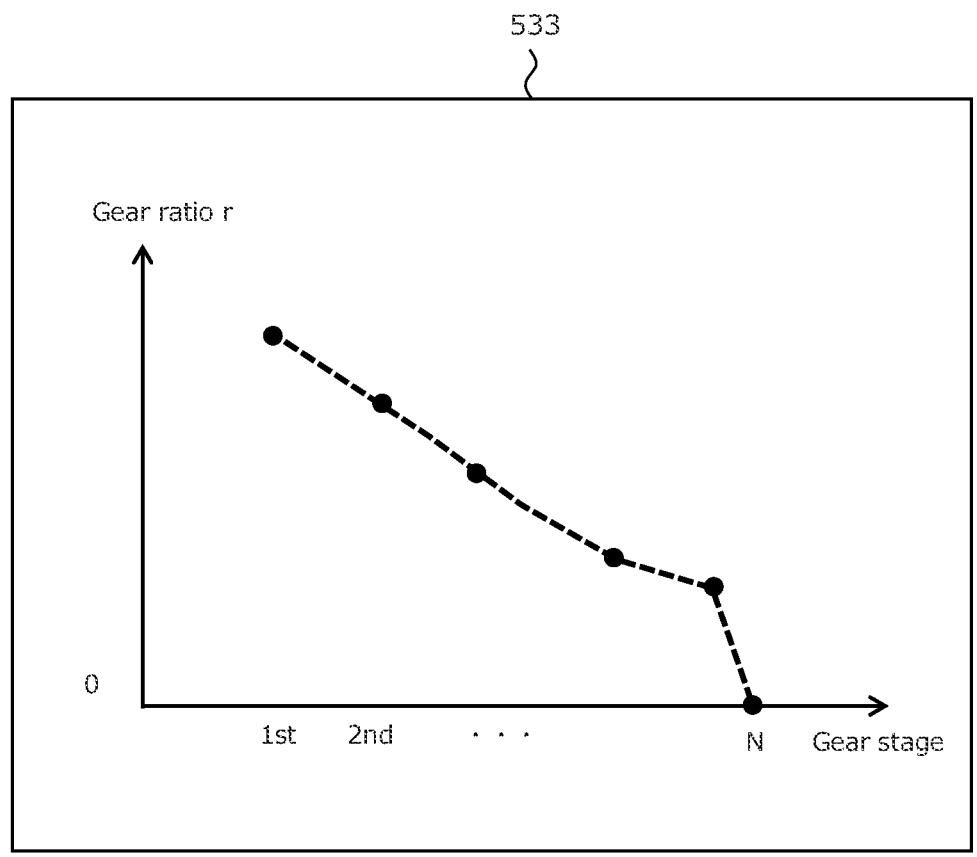
FIG. 9 is a diagram illustrating an example of an MT model constituting the MT vehicle model shown in FIG. 6.

The MT model 533 calculates the gear ratio r. The gear ratio r is the gear ratio determined from the shift position Sp of the pseudo-gearshift 26 in the imaginary MT. The shift position Sp of the pseudo-gearshift 26 and the gear stage of the imaginary MT are in a one-to-one relation. The MT model 533 has, for example, a map as shown in FIG. 9. In this map, the gear ratio r is given for the gear stage. As shown in FIG. 9, the larger gear stage, the smaller the gear ratio r.

The MT model 533 calculates a transmission output torque Tgout using the gear ratio r. The transmission output torque Tgout is the torque output from the imaginary transmission. The MT model 533 calculates the transmission output torque Tgout from the clutch output torque Tcout and the gear ratio r by, for example, the following equation (3). The transmission output torque Tgout calculated by the MT model 533 is output to the axles and drive wheels model 534.

$$Tgout = Tcout \times r \tag{3}$$

2-5-5. Axles and Drive Wheels Model

The axles and drive wheels model 534 calculates the driving wheel torque Tw using a predetermined reduction ratio IT. The reduction ratio IT is a fixed value determined by the mechanical structure from the imaginary MT to the driving wheels 8. The value obtained by multiplying the reduction ratio rr by the gear ratio r is the total reduction ratio R described above. The axles and drive wheels model 534 calculates the driving wheel torque Tw from the transmission output torque Tgout and the reduction ratio rr by, for example, the following equation (4). The driving wheel torque Tw calculated by the axles and drive wheels model 534 is output to the required motor torque calculation unit 540.

$$Tw = Tgout \times rr \tag{4}$$

2-5-6. Torque Characteristic of Electric Motor Realized in MT Mode

Figure 10:
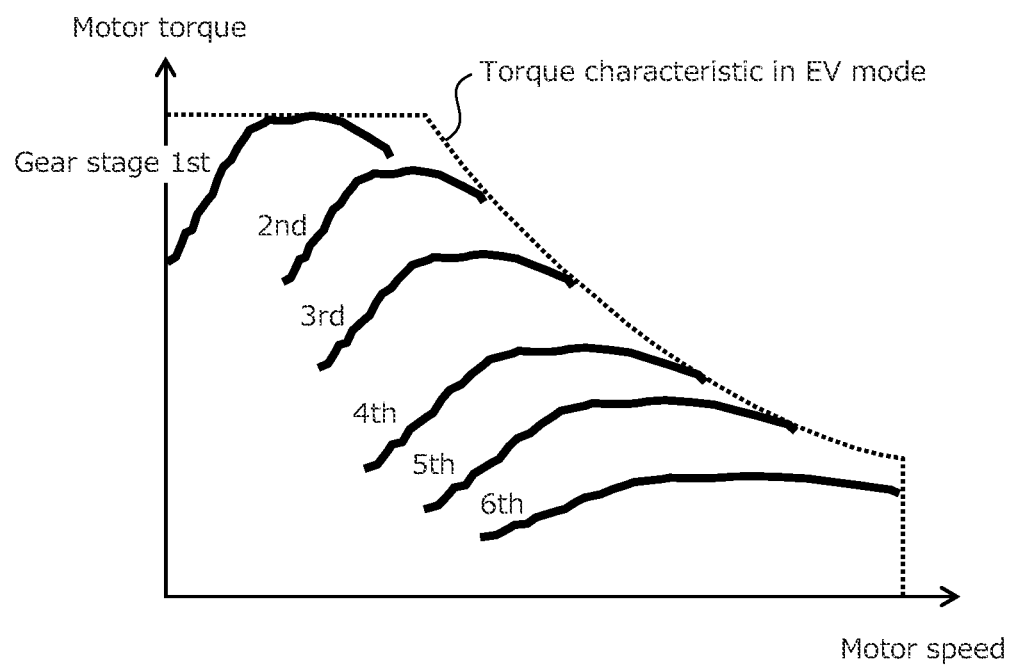
FIG. 10 is a diagram showing a torque characteristic of the electric motor realized in an MT mode compared with a torque characteristic of the electric motor realized in an EV mode.

The required motor torque calculation unit 540 converts the driving wheel torque Tw calculated by the MT vehicle model 530 into motor torque. FIG. 10 is a diagram showing the torque characteristic of the electric motor 2 realized in the MT mode, and in particular, the characteristic of the motor torque with respect to the motor rotation speed, as compared with the torque characteristic of the electric motor 2 realized in the EV mode. In the MT mode, as shown in FIG. 10, it is possible to realize a torque characteristic (solid line in the drawing) such as to simulate the torque characteristic of the MT vehicle according to the gear stage set by the pseudo-gearshift 26.

2-6. Traveling Mode Determination

2-6-1. Summary

Next, the traveling mode determination by the traveling mode determination unit 500 will be described. As mentioned above, there is a difference in logic to calculate motor torque between the MT mode and the EV mode. Therefore, when switching is performed between the MT mode and the EV mode, a torque level difference may occur due to a deviation between the motor torque Tmt and the motor torque Tev. This torque level difference, as described above, is suppressed by performing the gradual change process of the motor torque for a while after switching. In any event, however, immediately after switching the traveling mode, acceleration or deceleration as intended by the driver may not be obtained.

When the driver cannot obtain the intended acceleration or deceleration, it may lead to unsafety or anxiety depending on the conditions in which the self vehicle is placed. The conditions that lead to unsafety and anxiety include a road environment such as a curve road and an intersection. A traveling scene, such as overtaking and entering, is also included in the conditions that leads to unsafety and anxiety. In addition, a surrounding environment, such as a narrow inter-vehicle distance, a succeeding vehicle with high speed, a large number of pedestrians, poor visibility, and crowding, is also included in the conditions that leads to unsafety and anxiety. In such a condition, when the safety and security for the driver is given the highest priority, it is preferable not to switch the traveling mode according to the driver's choice.

Figure 11:
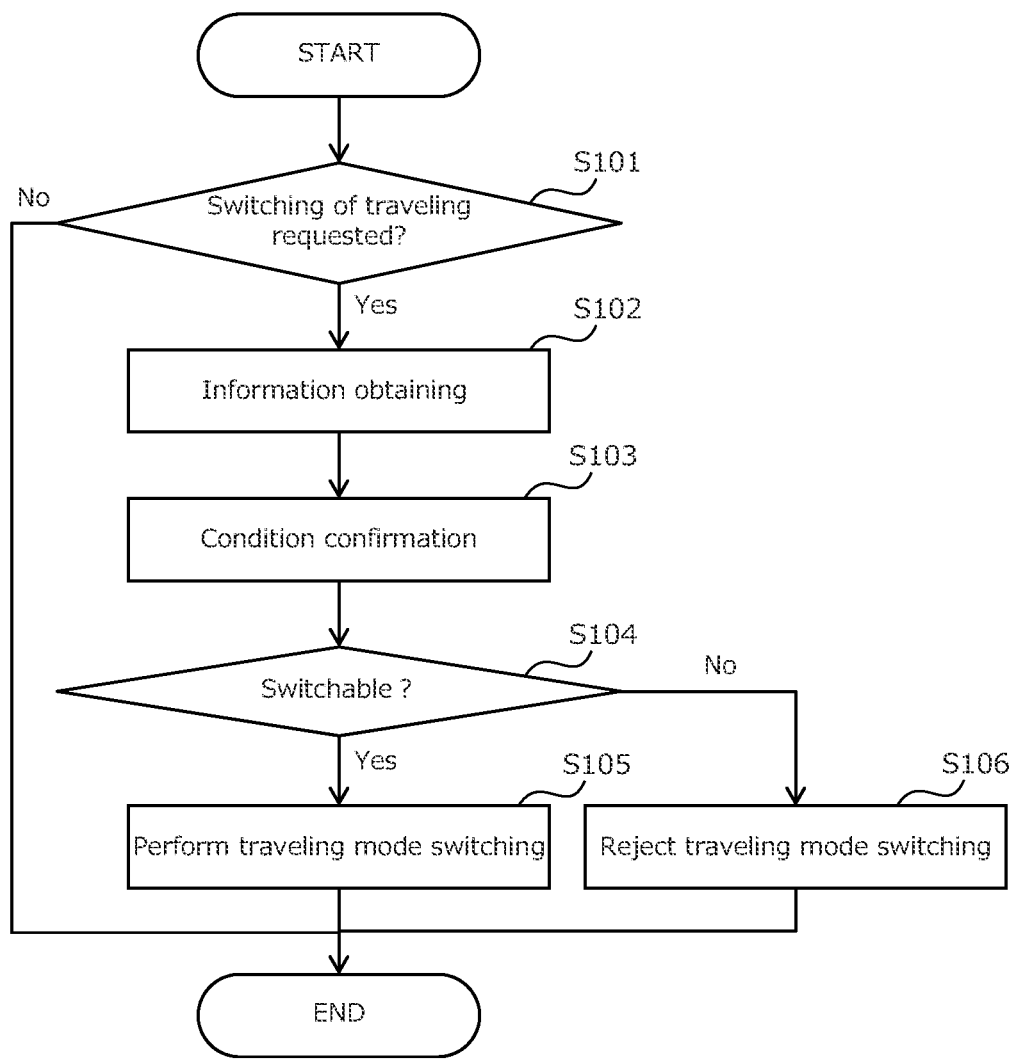
FIG. 11 is a flowchart showing a procedure of a first embodiment of a traveling mode switching process.
Figure 12:
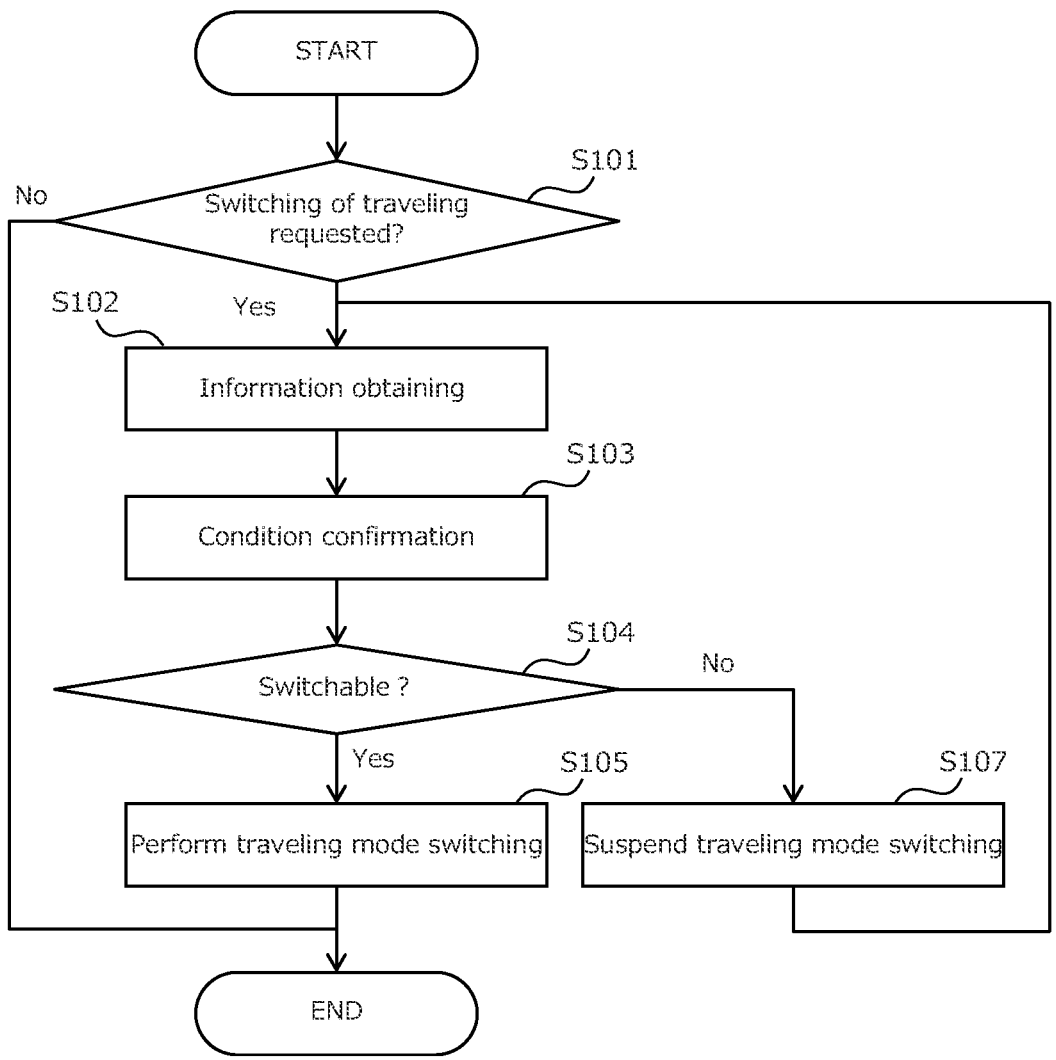
FIG. 12 is a flowchart showing a procedure of a second embodiment of the traveling mode switching process.
Figure 13:
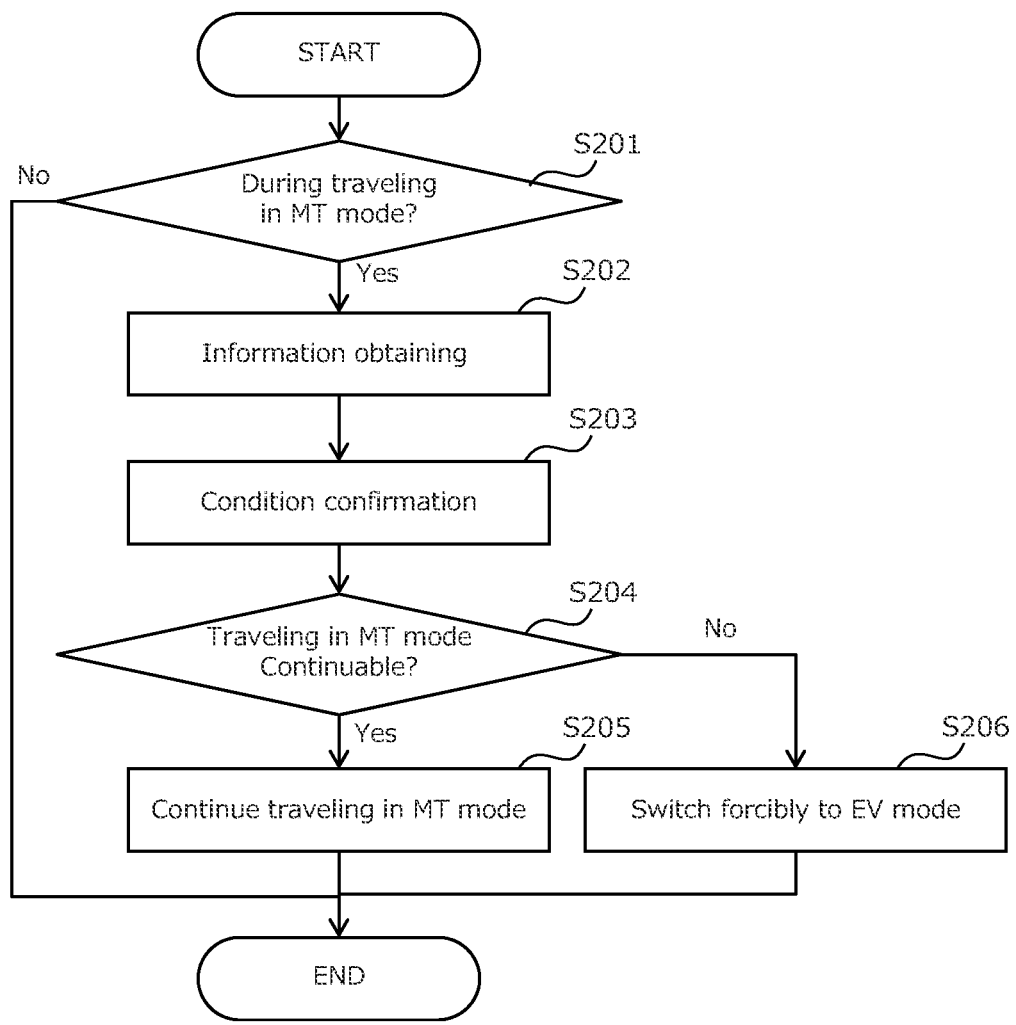
FIG. 13 is a flowchart showing a procedure of a forced switching process to the EV mode.

Each flowchart of FIGS. 11 to 13 illustrates a procedure of a switching process of the traveling mode including the traveling mode determination by the traveling mode determination unit 500. FIG. 11 shows the procedure of the first embodiment of the switching process of the traveling mode, and FIG. 12 shows the procedure of the second embodiment of the switching process of the traveling mode. The traveling mode determination unit 500 performs the switching process of the travel mode according to either of the procedures. On the other hand, FIG. 13 shows the procedure of the forced switching process to the EV mode performed when the MT mode is selected. The forced switching process shown in FIG. 13 may be implemented alone, or may be implemented in combination with the switching process of the traveling mode shown in FIG. 11 or 12.

2-6-2. First Embodiment of Switching Process of Traveling Mode

In the first embodiment shown in FIG. 11, in the step S101, the presence or absence of a request for switching of the traveling mode is determined. Until the mode selector 42 is operated, it is determined that the switching of the traveling mode is not requested. When the selection by the mode selector 42 is switched from the MT mode to the EV mode or from the EV mode to the MT mode, the determination of the step S101 becomes Yes.

When the determination of the step S101 becomes Yes, the process of the step S102 is performed. In the step S102, the information about the conditions in which the self vehicle is placed is obtained. The external sensors 60, 62, 64 are used to obtain the information. However, the information obtained by the external sensors 60, 62, 64 is the information used also in the advanced driver assistance system (ADAS). Therefore, obtaining the information by the external sensors 60, 62, 64 is continuously performed not only at the time of switching the traveling mode.

Next, in the step S103, confirmation of the conditions is performed based on the information obtained in the step S102. The conditions to be confirmed are, for example, a road environment in which the self vehicle is traveling, a current traveling scene, and a surrounding environment of the self vehicle. The items of the conditions to be confirmed are predetermined. For example, a distance to a preceding vehicle, a distance to a succeeding vehicle, a congestion degree of a road, and presence or absence of pedestrians, etc. are included in the items. Each item is the item used for the traveling mode switching determination. In the step S103, confirmation is performed for each of them.

In the step S104, it is determined whether the traveling mode can be switched as requested by the driver based on the result of the condition confirmation performed in the step S103. The criterion for whether the traveling mode can be switched is whether it leads to unsafety or anxiety for the driver. It may be determined that the traveling mode cannot be switched when even one of the items meets the criterion, or it may be determined that the traveling mode cannot be switched when a plurality of the items meet the criterion. Alternatively, it may be determined that the traveling mode cannot be switched when a combination of predetermined items meets the criterion. For example, the determination may be made such that the traveling mode can be switched, simply when there are many pedestrians, but the traveling mode cannot be switched when there are many pedestrians in the intersection.

When the determination result of the step S104 is Yes, in the step S105, the switching of the traveling mode is performed as requested by the driver. On the other hand, when the determination result of the step S104 is No, the switching of the traveling mode requested by the driver is rejected in the step S106. In other words, even if the request is made by the driver, the switching of the traveling mode that leads to unsafety or anxiety is not performed. This allows the driver to enjoy both driving in the MT mode and driving in the EV mode without unsafety and anxiety.

2-6-3. Second Embodiment of Switching Process of Traveling Mode

The second embodiment shown in FIG. 12 is different from the first embodiment in only the process after the determination of the step S104. In the second embodiment, when the determination result of the step S104 is No, the switching of the traveling mode requested by the driver is suspended in the step S107. Then, the routine of the steps S102, S103, S104 and S107 is repeated.

When the conditions change while the above routine is repeated, the switching of the traveling mode becomes possible eventually, and the determination of the step S104 becomes Yes. When the determination of the step S104 is Yes, the traveling mode is switched as requested by the driver in the step S105. According to the second embodiment as well, the driver can also enjoy both driving in the MT mode and driving in the EV mode without unsafety and anxiety.

2-6-4. Forced Switching Process to EV Mode

In the forced switching process to the EV mode, as shown in FIG. 13, in the step S201, it is determined whether or not the electric vehicle 10 is traveling in the MT mode. When the electric vehicle 10 is traveling in the EV-mode, subsequent processing is skipped.

When the electric vehicle 10 is traveling in the MT mode, the process of the step S202 is performed. In the step S202, the information about the conditions in which the self vehicle is placed is obtained. The external sensors 60, 62, 64 are used to obtain the information. As described above, obtaining the information by the external sensors 60, 62, 64 is continuously performed.

Next, in the step S203, confirmation of the conditions is performed based on the information obtained in the step S202. The conditions to be confirmed are, for example, the road environment in which the self vehicle is traveling, the current traveling scene, and the surrounding environment of the self vehicle. The items of the conditions to be confirmed are predetermined. Each item is used for the determination of forced switching to the EV mode. In the step S203, confirmation is performed for each of them.

In the step S204, it is determined whether traveling in the MT mode can be continued based on the result of the condition confirmation performed in the step S203. The criterion for whether the traveling mode can be switched is whether it leads to unsafety or anxiety for the driver. Mixed traffic of pedestrians and vehicles is an example of a case in which free traveling in the MT mode cannot be permitted for the driver.

When the determination result of the step S204 is Yes, the continuation of traveling in the MT mode is permitted in the step S205. On the other hand, when the determination result of the step S204 is No, the traveling mode is forcibly switched from the MT mode to the EV mode in the step S206. At that time, the driver is notified by voice or display that the traveling mode has been switched to the EV mode. Immediately after the forced switching to the EV mode, the gradual change process of the motor torque for not causing a torque level difference due to the switching to the EV mode is performed. The forced switching to the EV mode is performed according to the conditions in which the self vehicle is placed so that the driver can enjoy driving in the MT mode without unsafety and anxiety.

3. Other

The electric vehicle 10 according to the above embodiment is an FF vehicle that drives the front wheels in one electric motor 2. However, the present disclosure is also applicable to an electric vehicle in which two electric motor are arranged in front and rear to drive each of the front and rear wheels. The present disclosure is also applicable to an electric vehicle comprising an in-wheel motor on each wheel. The MT vehicle model of these cases may be a model in which an all-wheel-drive vehicle with MT is modeled.

The electric vehicle 10 according to the above embodiment is not provided with a transmission. However, the present disclosure is also applicable to an electric vehicle having a stepped or continuously variable automatic transmission. In this case, the power train consisting of the electric motor and the automatic transmission may be controlled so as to output the motor torque calculated by MT vehicle model.

What is claimed is:

1. An electric vehicle configured to use an electric motor as a power device for traveling, the electric vehicle comprising:

an accelerator pedal;
a pseudo-clutch pedal;
a pseudo-gearshift;
an external sensor configured to detect a condition in which the electric vehicle is placed;
a mode selector configured to select a control mode of the electric motor between a first mode and a second mode; and
a controller configured to control a motor torque output by the electric motor in accordance with the control mode selected by the mode selector,
wherein the controller comprises:
a memory configured to store:
an MT vehicle model simulating a torque characteristic of a driving wheel torque in an MT vehicle having an internal combustion engine whose torque is controlled by operation of a gas pedal and a manual transmission whose gear stage is switched by operation of a clutch pedal and operation of a gearshift; and
a motor torque command map defining a relationship of a motor torque with respect to an operation amount of the accelerator pedal and a rotation speed of the electric motor; and
a processor configured to execute:
in the first mode,
a process of receiving an operation amount of the accelerator pedal as an input of an operation amount of the gas pedal with respect to the MT vehicle model,
a process of receiving an operation amount of the pseudo-clutch pedal as an input of an operation amount of the clutch pedal with respect to the MT vehicle model,
a process of receiving a shift position of the pseudo-gearshift as an input of a shift position of the gearshift with respect to the MT vehicle model,
a process of calculating the driving wheel torque determined from the operation amount of the gas pedal, the operation amount of the clutch pedal and the shift position of the gearshift using the MT vehicle model, and
a process of calculating the motor torque for giving the driving wheel torque to driving wheels of the electric vehicle;
in the second mode,
a process of disabling the operation of the pseudo-clutch pedal and the operation of the pseudo-gearshift, and
a process of calculating the motor torque using the motor torque command map based on the operation amount of the accelerator pedal and the rotation speed of the electric motor; and
in response to a change of selection of the control mode by the mode selector,
a process of performing a first determination whether the control mode can be switched, based on the condition detected by the external sensor, and
a process of switching the control mode according to the result of the first determination.

2. The electric vehicle according to claim 1, wherein the processor is configured to execute in response to a negative result of the first determination,
a process of rejecting switching of the control mode, and
a process of suspending the change of selection of the control mode by the mode selector until the result of the first determination becomes affirmative, any one of the processing executes.

3. The electric vehicle according to claim 1, wherein the external sensor is configured to detect at least one of a distance to a preceding vehicle, a distance to a succeeding vehicle, a degree of congestion of a road, and presence or absence of a pedestrian as the condition.

4. The electric vehicle according to claim 1, wherein the processor is configured to execute in the first mode,
a process of performing a second determination whether it is possible to continue the first mode, based on the condition detected by the external sensor, and
in response to a negative result of the second determination, a process of forcibly switching the control mode from the first mode to the second mode.

* * * * *